United States Patent
Drury et al.

(10) Patent No.: US 11,735,226 B2
(45) Date of Patent: *Aug. 22, 2023

(54) SYSTEMS AND METHODS FOR DYNAMICALLY AUGMENTING VIDEOS VIA IN-VIDEO INSERTION ON MOBILE DEVICES

(71) Applicant: Yahoo Ad Tech LLC, Dulles, VA (US)

(72) Inventors: Christopher Drury, Bethpage, NY (US); Mike Cornell, Brooklyn, NY (US); Stephen Hodnicki, Alpharetta, GA (US); Benjamin Su, Brooklyn, NY (US); Kaypree Hodges, New York, NY (US); Raquel Rahmey, New York, NY (US)

(73) Assignee: Yahoo Ad Tech LLC, Dulles, VA (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/139,354

(22) Filed: Dec. 31, 2020

(65) Prior Publication Data

US 2021/0127177 A1   Apr. 29, 2021

Related U.S. Application Data

(63) Continuation of application No. 16/235,873, filed on Dec. 28, 2018, now Pat. No. 10,911,837.

(51) Int. Cl.
*G11B 27/036* (2006.01)
*H04N 21/81* (2011.01)
(Continued)

(52) U.S. Cl.
CPC ............ *G11B 27/036* (2013.01); *G06T 7/11* (2017.01); *G06T 7/49* (2017.01); *G06V 10/44* (2022.01);
(Continued)

(58) Field of Classification Search
CPC .... H04N 21/812; H04N 21/8146; G06T 7/49; G06T 7/11; G06T 2207/20112
See application file for complete search history.

(56) References Cited

U.S. PATENT DOCUMENTS 10,911,837 B1 * 2/2021 Drury .................. G06T 7/11
2009/0249386 A1 * 10/2009 Shan .................. G06T 7/97
725/32

(Continued)

*Primary Examiner* — Kyu Chae
(74) *Attorney, Agent, or Firm* — Bookoff McAndrews, PLLC

(57) ABSTRACT

Disclosed are systems and methods for rendering augmented videos on mobile devices and computing environment with limited computational resources. The disclosed systems and methods provide a novel framework for performing automatic detection of surfaces in video frames resulting in the creation of a seamless in-video augmentation object experience for viewing users. The disclosed framework operates by leveraging available surfaces in digital content to show augmentation objects in compliance with various pre-established contextual and technical constraints. The disclosed framework evidences a streamlined, automatic and computationally efficient process(es) that modifies digital content at the surface level within the frames of the digital content based on the contextual and technical constraints, and the computational resources of the device augmented digital content is rendered on.

20 Claims, 12 Drawing Sheets

(51) Int. Cl.
  *G06T 7/49* (2017.01)
  *G06T 7/11* (2017.01)
  *G06V 10/764* (2022.01)
  *G06V 10/44* (2022.01)
  *G06V 20/40* (2022.01)

(52) U.S. Cl.
  CPC .......... *G06V 10/454* (2022.01); *G06V 10/764* (2022.01); *G06V 20/46* (2022.01); *H04N 21/812* (2013.01); *H04N 21/8146* (2013.01); *G06T 2207/20112* (2013.01)

(56) References Cited

U.S. PATENT DOCUMENTS

| | | | |
|---|---|---|---|
| 2014/0075481 A1* | 3/2014 | Roberts | H04N 21/4755 |
| | | | 725/46 |
| 2016/0232411 A1* | 8/2016 | Krishnamoorthy | G08G 1/04 |
| 2017/0278289 A1* | 9/2017 | Marino | G06T 11/60 |
| 2019/0075339 A1* | 3/2019 | Smith | H04N 21/25883 |
| 2019/0173935 A1 | 6/2019 | Lohmar | |
| 2020/0092590 A1* | 3/2020 | Carpenter | G06Q 30/0269 |

\* cited by examiner

SYSTEMS AND METHODS FOR DYNAMICALLY AUGMENTING VIDEOS VIA IN-VIDEO INSERTION ON MOBILE DEVICES

CROSS-REFERENCE TO RELATED APPLICATION(S)

This application is a continuation application of and claims the benefit of priority to pending prior U.S. Nonprovisional patent application Ser. No. 16/235,873 filed Dec. 28, 2018, which is incorporated herein by reference in its entirety.

TECHNICAL FIELD

The present disclosure relates to improving the performance of content hosting and providing devices, systems and/or platforms by modifying the capabilities and providing non-native functionality to such devices, systems and/or platforms through a novel and improved framework for modifying digital content based on detected surface within the displayed content.

BACKGROUND

Modern digital content hosting and publishing platforms, maintained by content providers, are capable of providing original programming and third party content to viewing users in a variety of different ways. In some instances, third party content can be woven into the original programming during interstitial, predetermined, slots. For example, digital advertisements can be overlaid atop original programming, displayed in pop-up windows or displayed in browser banners adjacent to the original programming.

Recently, content providers have attempted to insert third party video content into their original video programming that users are viewing. Such conventional insertion techniques involve performing surface detection and augmentation of video content to have the third party content seamlessly woven into a specific surface(s) depicted within the original video programming. This is a technically complex method that requires a vast amount of data processing and computational resources to parse, identify, and insert third party video content at specific locations within individual frame sets of the original video programming.

The aforementioned conventional techniques require expensive systems and intensive human intervention to ensure that third party content is inserted into the original programming at appropriate scenes (i.e., frame sets, also referred to as "shots"). This involves, for example, the manual identification and modification of video scenes by a human annotator, further tasked with identifying tags associated with specific frame set(s) and specific sets of pixels within each from of the set. For example, a human annotator may have to identify the location within a video and a specific position within each frame. Additionally, human annotators must ensure that the inserted digital advertisements match and satisfy the requirements and expectations of both the owner of the original programming and the advertiser.

Thus, as made apparent above, the manual processing required by conventional systems is inefficient, human labor intensive and exhausts vast amounts computational power. Furthermore, such processes raise the risk of errors in complying with Digital Rights Management (DRM) policies for hosting and presenting digital content over the internet—such systems put DRM responsibility in the hands of human annotators to acknowledge, accept and/or access read-write instructions associated with digital content prior to annotating and merging said digital content with underlying original programming.

SUMMARY OF THE DISCLOSURE

Embodiments of the present disclosure include systems and methods for techniques for rendering augmented digital content on mobile devices without ongoing assistance from a server.

According to certain embodiments, computer-implemented methods are disclosed for dynamically augmenting videos via in-video insertion on mobile devices. One method may include receiving a source video and corresponding source video constraints for one or more surfaces depicted therein, from a third party; analyzing the source video in order to identify one or more surfaces depicted therein; comparing the identified surfaces of the source video to surfaces stored in a database that may satisfy the source video constraints; scoring the surfaces stored in the database based on a comparison of the identified surfaces and the surfaces stored in the database that may satisfy the source video constraints; receiving one or more augmentation objects and corresponding augmentation object constraints for one or more surfaces depicted therein, from an endorser; analyzing the one or more augmentation objects in order to identify one or more surfaces depicted therein; comparing the identified surfaces corresponding to the one or more augmentation objects to a subset of surfaces stored in a database that may satisfy the augmentation object constraints; scoring the subset of surfaces stored in the database based on a comparison of the identified surfaces and the surfaces stored in the database that may satisfy the augmentation object constraints; determining whether to pair one or more augmentation objects with the source video based on the scores assigned to the surfaces and subset of surfaces stored in the database; modifying the source video by augmenting the source video with the one or more augmentation objects; rendering an augmented video such that the one or more augmentation objects are displayed on the identified subset of surfaces that satisfy the augmentation object constraints.

According to certain embodiments, systems are disclosed for dynamically augmenting videos via in-video insertion on mobile devices. One system may include a processor configured to execute the instructions to perform a method including: receiving a source video and corresponding source video constraints for one or more surfaces depicted therein, from a third party; analyzing the source video in order to identify one or more surfaces depicted therein; comparing the identified surfaces of the source video to surfaces stored in a database that may satisfy the source video constraints; scoring the surfaces stored in the database based on a comparison of the identified surfaces and the surfaces stored in the database that may satisfy the source video constraints; receiving one or more augmentation objects and corresponding augmentation object constraints for one or more surfaces depicted therein, from an endorser; analyzing the one or more augmentation objects in order to identify one or more surfaces depicted therein; comparing the identified surfaces corresponding to the one or more augmentation objects to a subset of surfaces stored in a database that may satisfy the augmentation object constraints; scoring the subset of surfaces stored in the database based on a comparison of the identified surfaces and the surfaces stored in the database that may satisfy the augmentation object constraints; determining whether to pair one or more augmentation objects with the source video based on the scores assigned to the surfaces and subset of surfaces stored in the database; modifying the source video by augmenting the source video with the one or more augmentation objects; rendering an augmented video such that the one or more augmentation objects are displayed on the identified subset of surfaces that satisfy the augmentation object constraints.

According to certain embodiments, non-transitory computer readable medium are disclosed for dynamically augmenting videos via in-video insertion on mobile devices. One non-transitory computer readable medium may include a processor configured to execute the instructions from a storage device to perform a method including include receiving a source video and corresponding source video constraints for one or more surfaces depicted therein, from a third party; analyzing the source video in order to identify one or more surfaces depicted therein; comparing the identified surfaces of the source video to surfaces stored in a database that may satisfy the source video constraints; scoring the surfaces stored in the database based on a comparison of the identified surfaces and the surfaces stored in the database that may satisfy the source video constraints; receiving one or more augmentation objects and corresponding augmentation object constraints for one or more surfaces depicted therein, from an endorser; analyzing the one or more augmentation objects in order to identify one or more surfaces depicted therein; comparing the identified surfaces corresponding to the one or more augmentation objects to a subset of surfaces stored in a database that may satisfy the augmentation object constraints; scoring the subset of surfaces stored in the database based on a comparison of the identified surfaces and the surfaces stored in the database that may satisfy the augmentation object constraints; determining whether to pair one or more augmentation objects with the source video based on the scores assigned to the surfaces and subset of surfaces stored in the database; modifying the source video by augmenting the source video with the one or more augmentation objects; rendering an augmented video such that the one or more augmentation objects are displayed on the identified subset of surfaces that satisfy the augmentation object constraints.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
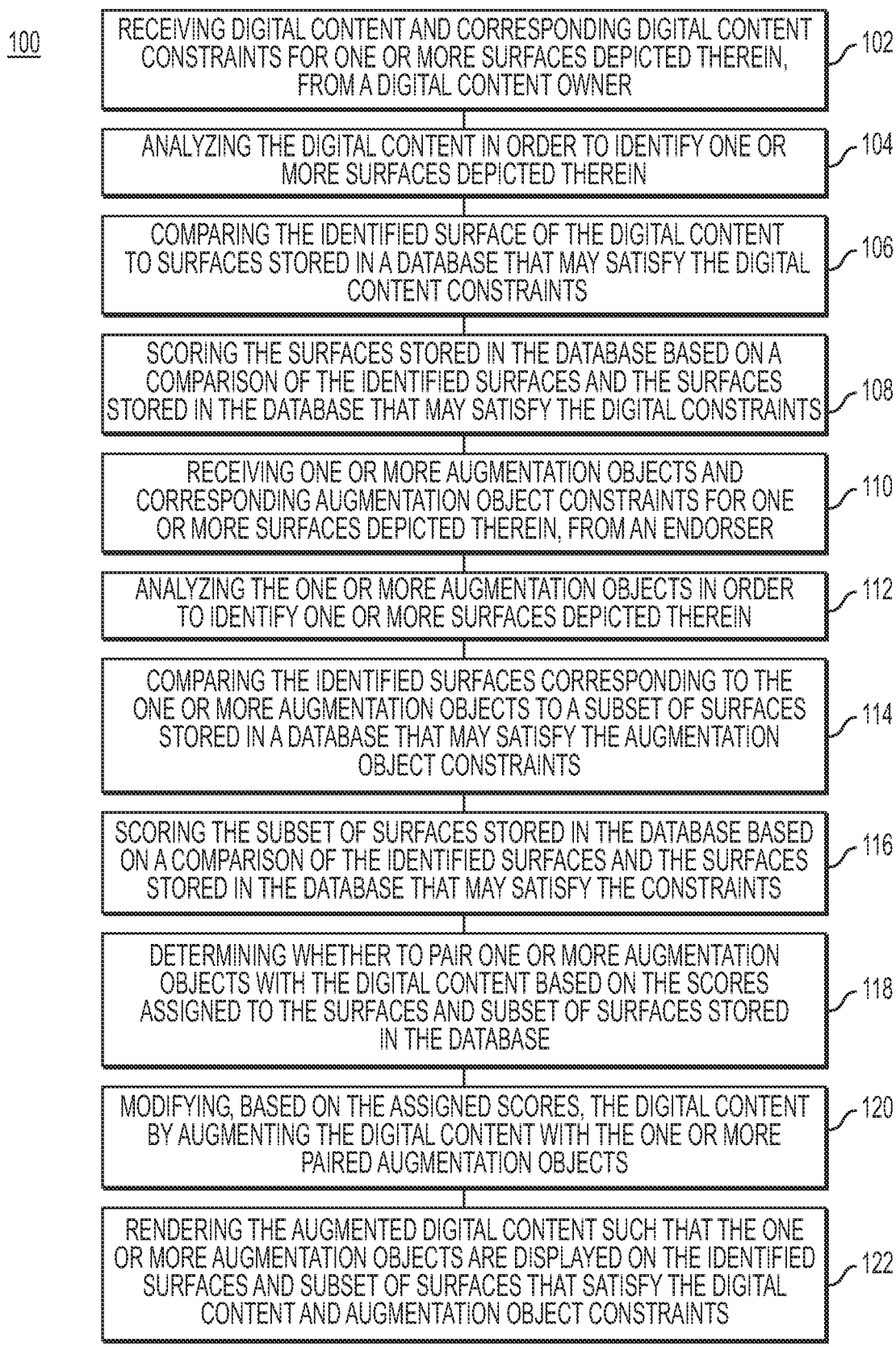
FIG. 1 is a flow diagram illustrating an exemplary method for dynamically augmenting videos via in-video insertion on mobile devices.

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description. Various non-limiting embodiments of the present disclosure will now be described to provide an overall understanding of the principles of the structure, function, and use of system and method for dynamically augmenting videos via in-video insertion on mobile devices.

As described above, there is a need in the field of digital content augmentation for rendering customized augmented digital content (e.g. video) tailored to the computing environment of a user, especially in computing environments with limited computational resources. Conventional digital content augmentation techniques for rendering customized augmentations on digital content are prohibitively expensive and computationally demanding. Accordingly, the present disclosure is directed to techniques for rendering augmented digital content on mobile devices without ongoing assistance from a server. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine-readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure, the term "server" should be understood to refer to a service point that provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software, for example virtual servers, and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof Likewise, sub-networks, which may employ differing architectures or may be compliant or compatible with differing protocols, may intemperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, Bluetooth, 802.llb/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as live broadcasts of professional sporting events).

As discussed herein, reference to an "augmentation object" should be understood to include, but not be limited to, digital media content embodied as a media item that provides information provided by another user, service, third party, entity, and the like. Such augmentation objects can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network-associated party.

The principles described herein may be embodied in many different forms. The disclosed systems and methods provide advanced mechanisms for dynamically integrating augmentation objects (e.g. digital advertisements) into specifically identified portions and/or locations of videos. The disclosed framework provides for the dynamic ad integration based on two bases: i) supporting the requirements of the content owner (e.g., definitions of which surfaces/locations within the video are qualified to be modified/augmented with additional content), and ii) ensuring that the third parties (e.g. advertisers or endorsers) (the entities providing the augmentation objects) have and retain control over which kinds of videos their augmentation objects are inserted into, and where within such videos they are inserted.

The disclosed systems and methods, therefore, provide an end-to-end framework that satisfies a parties' rights/requirements—the digital content owners and the endorses thereby ensuring that not only is their content disseminated in their desired manner, but it is also protected against unwanted access and/or modification by unsolicited parties. The disclosed systems and methods execute this framework by using computer vision to create new an ad inventory that creates new revenue opportunities to content owners and new opportunities for brands to reach their audiences. That is, as a result of the implementation of the disclosed framework, content owners are capable of generating new forms of ad revenue while protecting their best interests with regards to their content and their users' experiences. Endorsers have additional networked opportunities to integrate their augmentation objects in a seamless fashion into digital content while having and maintaining full control over how and where their augmentation objects are integrated.

Applications of the disclosed framework can involve processing of a digital content (e.g. a video) in any format that is either known or to be known (e.g., any type of file format and/or rendering format). For purposes of this disclosure, the discussion herein focuses on video files; however, this should not be construed as limiting, as any type of known or to be known format of media, whether images or other forms of multi-media, for example, can be utilized without departing from the scope of the instant disclosure.

In one embodiment, a source video and a set of augmentation object constraints for surfaces depicted in the source video may be electronically received from an endorser. The source video is analyzed in order to identify one or more surfaces depicted therein and further compared to surfaces stored in a database that may satisfy the third party constraints. Further, based on the comparison between the identified surfaces and the surfaces stored in a database that satisfy the constraints, the identified surfaces are classified. Moreover, one or more augmentation objects and corresponding augmentation object constraints may be electronically received from an endorser. The set of augmentation object constraints are then analyzed in order to identify a subset of surfaces in the database that satisfy the augmentation object constraints. The digital content is then modified by augmenting the digital content with the augmentation object and further rendered such that the augmentation object is displayed on the identified subset of surfaces of the augmented digital content that satisfy the augmentation object constraints.

FIG. 1 depicts a flow diagram of an exemplary method for dynamically augmenting videos via in-video insertion on mobile devices. As shown in FIG. 1, method 100 comprises a step in which source video and source video constraints for one or more surfaces depicted in the source video, are received from digital content owner (Step 102). For example, an online publisher can electronically receive a video from a digital content owner for publication on an application, website or virtual world and in addition to receiving a video from digital content owner, an online publisher may also receive surface constraints which may be a set of preferences, rules and/or definitions that govern how the source video can be modified. Method 100 further comprises a step in which the source video is analyzed in order to identify one or more surfaces depicted therein (Step 104). The identified surfaces corresponding to the source video are compared against surfaces stored in a database that may satisfy the source video constraints (Step 106). The surfaces stored in the database that may satisfy the constraints are then scored based on a comparison of the identified surfaces corresponding to the source video and the surfaces stored in the database that may satisfy the source video constraints (Step 108). One or more augmentation objects and corresponding augmentation object constraints for one or more surfaces depicted therein, are received from an endorser (Step 110). For example, an online publisher may receive a digital promotion/advertisement from an advertiser along with one or more constraints which may be a set of preferences, rules and/or definitions that govern how the promotion/advertisement can be modified and/or govern what additional content it can be presented with. The set of augmentation object constraints are analyzed in order to identify a one or more surfaces depicted therein (Step 112). The identified surfaces corresponding to the one or more augmentation objects are compared against to a subset of surfaces stored in a database that may satisfy the augmentation object constraints (Step 114). The subset of surfaces stored in the database that may satisfy the constraints are then scored based on a comparison of the identified surfaces corresponding to the one or more augmentation objects and the one or more subset of surfaces stored in the database that may satisfy the constraints (Step 116). Further, method 100 continues with a step determining whether to pair one or more augmentation objects with the digital content based on the scores assigned to the surfaces and subset of surfaces stored in the database (Step 118). Based on the assigned scores, modifying the digital content by augmenting the digital content with the one or more augmentation objects (Step 120). Here, the scores may be assigned a numerical value, ranked, compared and further evaluated and matched based on the scores falling within a specific range (e.g. predetermined range) an/or exceeding a threshold. Rendering the augmented digital content such that the one or more augmentation objects are displayed on the identified surfaces and subset of surfaces that satisfy the digital content and augmentation object constraints (Step 122).

Figure 2:
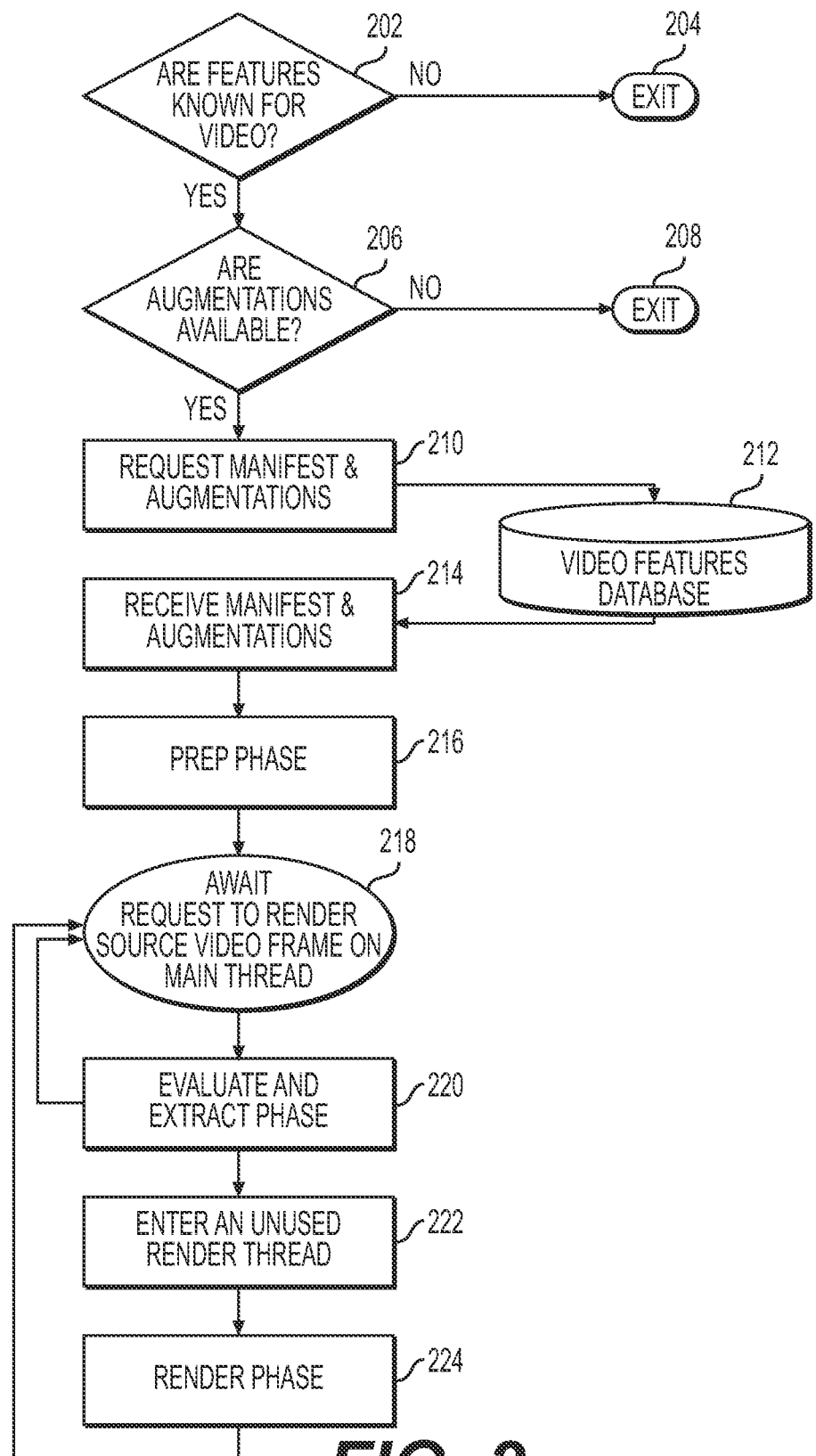
FIG. 2 is a flow diagram illustrating an exemplary data flow and source video feature extraction process in accordance with some embodiments of the present disclosure.

FIG. 2 is a flow diagram illustrating an exemplary data flow and digital content feature extraction process in accordance with some embodiments of the present disclosure. As shown in FIG. 2, method 200 comprises a step of detecting whether features are known for digital content (e.g. a source video) (Step 202). If features are not known or are undeterminable for the source video, the process is terminated (Step 204). However, if features are known regarding the source video, a system (not depicted) corresponding to an online publisher, determines which augmentations are available for the source video (Step 206). If no augmentations are available for the source video, the process is terminated (Step 208). However, if augmentations are available for the source video a request for a manifest and augmentations is made by the system (Step 210). The request for the manifest and augmentations further entails querying a video features database (Step 212). The online publisher system (not shown) then receives the manifest and augmentations from the video features database (Step 214). An augmented video is then prepared for rendering, wherein homography transformation data is generated, shader functions are implemented and a maximum priority render thread pool is initialized (Step 216). The prepared augmented video is then placed in queue in a process by which the augmented video can be rendered frame-by-frame (Step 218). The augmented video is then evaluated by calculating a current frame enqueue to be rendered and further analyzed in order to determine if the current frame has augmentation slots available, and in order for the augmented video to be extracted for rendering (Step 220). An unused render thread is then identified and the augmented video is queued for rendering on the identified unused render thread (Step 222). While the augmented video is queued, the rendering operation is halted if the queue is full, however if the queue is not full the video prepared for use by the graphical processing (GPU) and transmitted to the screen of a device (Step 224).

Figure 3:
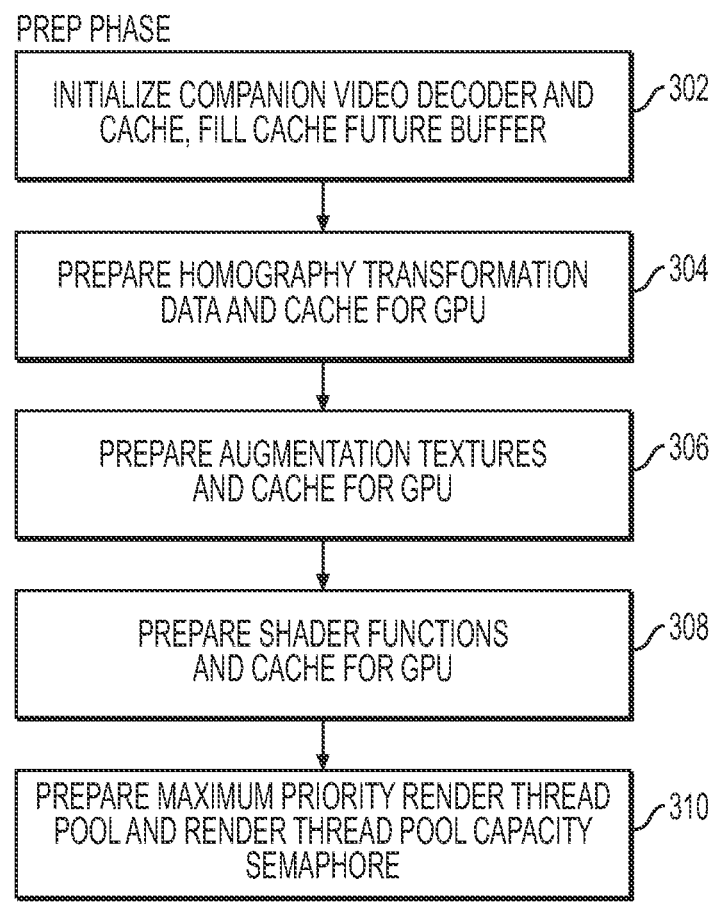
FIG. 3 is a flow diagram illustrating an exemplary data flow and content preparation process in accordance with some embodiments of the present disclosure.

FIG. 3 is a flow diagram illustrating an exemplary data flow and content preparation process in accordance with some embodiments of the present disclosure. During the augmented video preparation phase, as disclosed in FIG. 2, the augmented video is prepared for rendering. In preparing the augmented video, instructions for decoding the video, generating a companion video, and video synchronization are implemented (Step 302). Here, the companion video is generated from features extracted from the source video (e.g., original video) and encoded as a video which visually matches the source video and depicts the contrast between the foreground and background of the source video. Further, homography transformation data and GPU cache are made available for immediate and/or future use (Step 304). Nomography transformation data may be generated by one or more means of, but not limited to: a direct linear transformation algorithm utilizing a homography matrix, automatic image mosaicing, and feature matching utilizing content descriptors. Identified, potential, augmentation textures are prepared and GPU cache made available for immediate and/or future use (Step 306). During the augmented video preparation phase, shader functions are also initialized and GPU cache made available for immediate and/or future use (Step 308).

Figure 4:
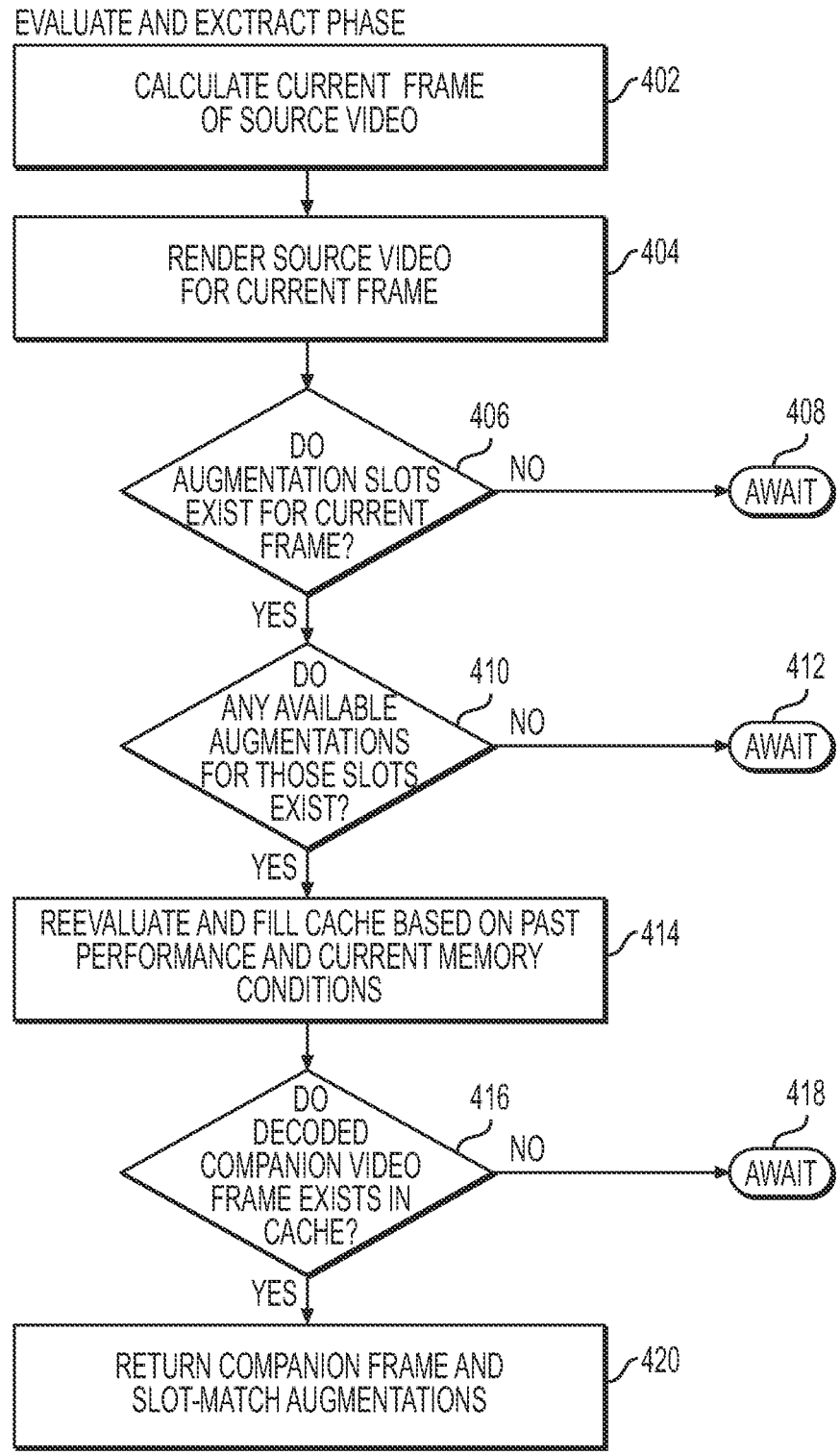
FIG. 4 is a flow diagram illustrating an exemplary data flow and extraction process in accordance with some embodiments of the present disclosure.

FIG. 4 is a flow diagram illustrating an exemplary evaluation and extraction process in accordance with some embodiments of the present disclosure. During the evaluation and extraction phase, the current frame of the source video is calculated and identified (Step 402). The source video is then rendered for the current frame (Step 404). The frame is further analyzed to determine whether augmentation slots are available for the frame (Step 406). If there are no augmentation slots available within the current frame, this process pauses and awaits the next render request (Step 408). If there are augmentation slots available within the current frame, the process proceeds and further determines whether there are augmentations objects (e.g. advertisement, promotions, or digital endorsements) with features that match augmentation object constraints that would allow the augmentation objects to be placed on the available augmentation slot (Step 410). If there are no augmentation objects available that match the augmentation object constraints, this process pauses and awaits the next render request (Step 412). A current cache state is evaluated based on past cache performance and current cache conditions (Step 414). Here, past buffer size and future buffer size may be calculated and used as constraints to determine whether current memory contents, renderings concurrently being buffered, and/or enqueued renderings, currently utilizing memory exceeding those constraints should be dumped. The evaluation and extraction phase, further performs a step determining whether a companion video frame exits in cache (Step 416). If no companion video frame exists in the cache, this process pauses and awaits the next companion vide frame (Step 418). The video companion frame and augmentation with constraints which match the constraints of the augmentation slots are then returned to the digital content feature extraction process disclosed in FIG. 2.

Figure 5:
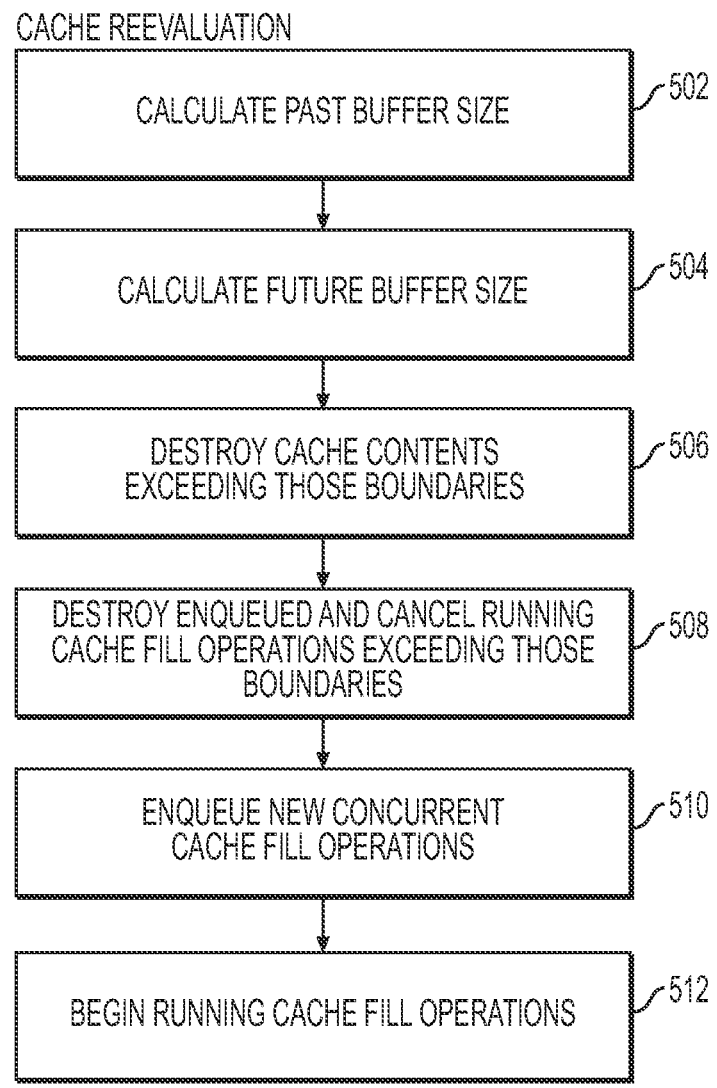
FIG. 5 is a flow diagram illustrating an exemplary cache reevaluation process in accordance with some embodiments of the present disclosure.

FIG. 5 is a flow diagram illustrating an exemplary cache reevaluation process in accordance with some embodiments of the present disclosure. Maximizing cache usage by prioritizing and/or excluding data for storage improves system efficiency and content rendering on mobile devices. The cache reevaluation phase calculates past buffer size (Step 502) and also calculates a future buffer size (Step 504). Here, past buffer size and future buffer size are determined in order to serve as boundaries/constraints for the size of future and concurrent, rendering data that will be stored. Data currently stored in cache exceeding the past and future buffer size constraints/boundaries is destroyed/dumped (Step 506). Additionally, enqueued rendering data and running cache fill operations exceeding the past and future buffer size constraints/boundaries are destroyed/dumped (Step 508). Data meeting the past and future buffer size constraints/boundaries are enqueued into the concurrent cache fill operation (Step 510). Cache fill operations for enqueued data meeting the past and future buffer size constraints/boundaries is then initialized (Step 512).

Figure 6:
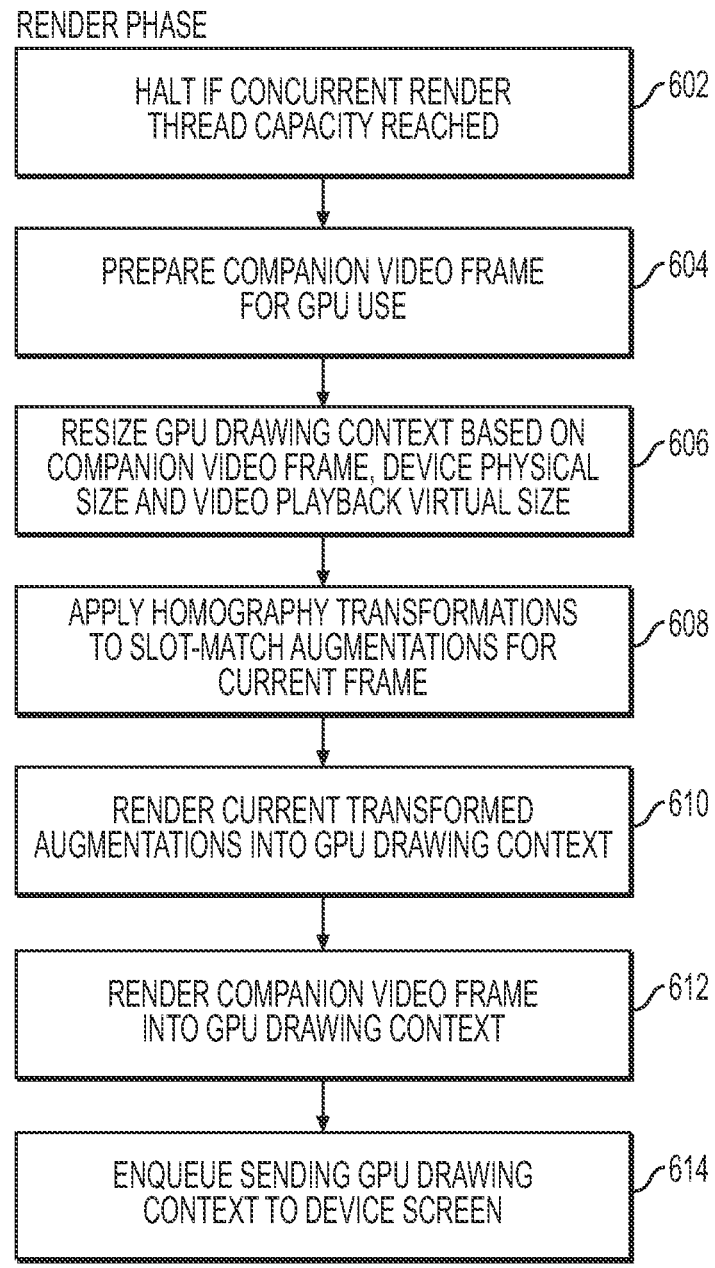
FIG. 6 is a flow diagram illustrating an exemplary augmented video rendering process in accordance with some embodiments of the present disclosure.

FIG. 6 is a flow diagram illustrating an exemplary augmented digital content rendering process in accordance with some embodiments of the present disclosure. The render phase is initialized by assessing the concurrent render thread capacity and halting the concurrent render thread if thread capacity has been reached (Step 602). The companion video frame for the GPU is prepared for use (Step 604). GPU resizing of source video is implemented based on the companion video frame, device physical size and video playback virtual size in order to generate a GPU drawing (Step 606). Homograpgy transformations are applied to the companion video and augmentation object pairs with matching constraints, for augmentation of the current frame (Step 608). The current augmentations are rendered in GPU drawing context (Step 610). The current companion video frame is rendered in GPU drawing context (Step 612). The GPU drawing is then enqueued and transmitted to a device screen (e.g. mobile device display).

Figure 7:
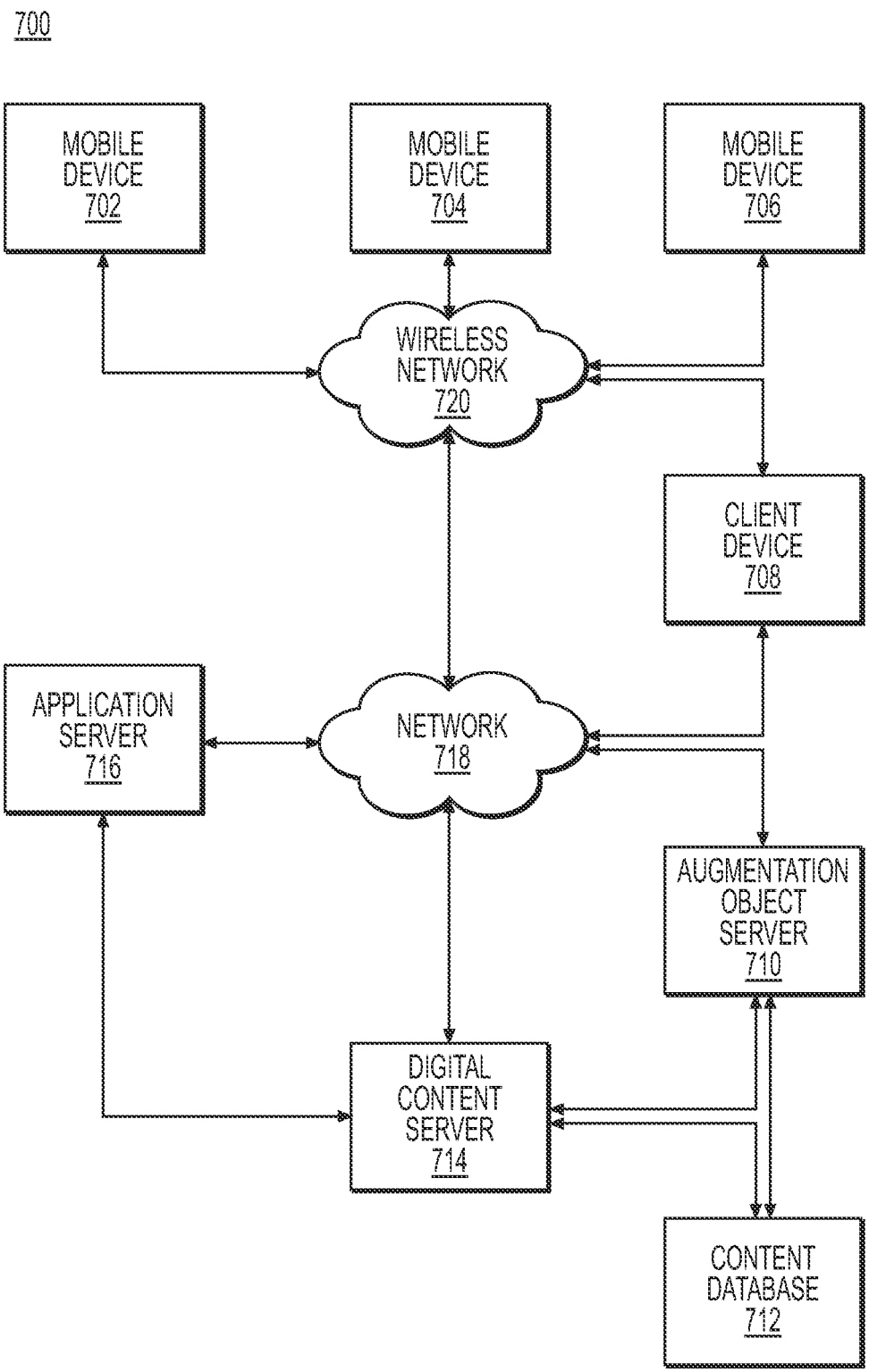
FIG. 7 is a schematic diagram illustrating an example of a network within which the systems and methods disclosed herein could be implemented according to some embodiments of the present disclosure.

In general, with reference to FIG. 7, a system 700 in accordance with an embodiment of the present disclosure is shown. FIG. 7 shows components of a general environment in which the systems and methods discussed herein may be practiced. Not all the components may be required to practice the disclosure, and variations in the arrangement and type of the components may be made without departing from the spirit or scope of the disclosure. As shown, system 700 of FIG. 7 includes local area networks ("LANs")/wide area networks ("WANs") network 705, wireless network 110, mobile devices (client devices) 702-706 and client device 708. FIG. 7 additionally includes a variety of servers, such as digital content server 614, application (or "App") server 716 and augmentation object server 710.

One embodiment of mobile devices 702-706 may include virtually any portable computing device capable of receiving and sending a message over a network, such as network 718, wireless network 720, or the like. Mobile devices 702-706 may also be described generally as client devices that are configured to be portable. Thus, mobile devices 702-706 may include virtually any portable computing device capable of connecting to another computing device and receiving information, as discussed above. As such, mobile devices 702-706 typically range widely in terms of capabilities and features.

Mobile devices 702-706 also may include at least one client application that is configured to receive content from another computing device. In some embodiments, mobile devices 702-706 may also communicate with non-mobile client devices, such as client device 708, or the like. In one embodiment, such communications may include sending and/or receiving messages, searching for, viewing and/or sharing photographs, digital images, audio clips, video clips, or any of a variety of other forms of communications.

Mobile devices 702-706 and client devices 708 may be capable of sending or receiving signals, such as via a wired or wireless network, or may be capable of processing or storing signals, such as in memory as physical memory states, and may, therefore, operate as a server.

Wireless network 720 is configured to couple mobile devices 702-706 and its components with network 718. Wireless network 720 may include any of a variety of wireless sub-networks that may further overlay stand-alone ad-hoc networks, and the like, to provide an infrastructure-oriented connection for mobile devices 702-706.

Network 718 is configured to couple digital content server 714, application server 716, or the like, with other computing devices, including, client device 708, and through wireless network 720 to mobile devices 702-706. Network 718 is enabled to employ any form of computer readable media or network for communicating information from one electronic device to another.

The digital content server 714 may include a device that includes a configuration to provide any type or form of content via a network to another device. Devices that may operate as content server 714 include personal computers desktop computers, multiprocessor systems, microprocessor-based or programmable consumer electronics, network PCs, servers, and the like. Content server 714 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

Augmentation object server 710 comprises a server that stores online announcements, promotions, reward information, and advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to endorsers (e.g. advertisers). For web portals like Yahoo!®, augmentation objects may be displayed on web pages or in apps resulting from a user-defined search based at least in part upon one or more search terms. Contextual relevant augmentation objects are beneficial to users. Thus, a variety of techniques have been developed to infer user interest, user intent or to subsequently target relevant augmentation objects to users. One approach to presenting targeted augmentation objects includes employing demographic characteristics (e.g., age, income, gender, occupation, geolocation via GPS etc.) for predicting user behavior, such as by group. Augmentation objects may be presented to users in a targeted audience based at least in part upon predicted user behavior(s).

Another approach includes profile-type augmentation object targeting. In this approach, user profiles specific to a user may be generated to model user behavior, for example, by tracking a user's path through a web site or network of sites, and compiling a profile based at least in part on pages or augmentation objects ultimately delivered. A correlation may be identified, such as for user purchases, for example. An identified correlation may be used to target potential purchasers by targeting content or augmentation objects to particular users. During presentation of augmentation objects, a presentation system may collect descriptive content about types of augmentation objects presented to users. A broad range of descriptive content may be gathered, including content specific to an advertising presentation system. Augmentation object analytics may be gathered and transmitted to locations remote to an augmentation object presentation system for storage or for further evaluation. Where augmentation object analytics transmittal is not immediately available, gathered augmentation object analytics may be stored by an augmentation object presentation system until transmittal of those advertising analytics becomes available.

In some embodiments, users are able to access services provided by servers 710, 714, and/or 716. This may include in a non-limiting example, authentication servers, search servers, email servers, social networking services servers, SMS servers, IM servers, MMS servers, exchange servers, photo-sharing services servers, and travel services servers, via the network 718 using their various devices 702-708. In some embodiments, applications, such as a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), and the like, can be hosted by the application server 716 (or digital content server 714 and the like).

Thus, the application server 716, for example, can store various types of applications and application related information including application data and user profile information (e.g., identifying and behavioral information associated with a user). It should also be understood that digital content server 714 may also store various types of data related to the content and services provided by digital content server 714 in an associated content database 712, as discussed in more detail below. Embodiments exist where the network 718 is also coupled with/connected to a Trusted Search Server (TSS), which can be utilized to render content in accordance with the embodiments discussed herein. Embodiments exist where the TSS functionality can be embodied within servers 710, 714, and/or 716.

Moreover, although FIG. 7 illustrates servers 710, 714 and 716 as single computing devices, respectively, the disclosure is not so limited. For example, one or more functions of servers 710, 714, and/or 716 may be distributed across one or more distinct computing devices. Moreover, in one embodiment, servers 710, 714, and/or 716 may be integrated into a single computing device, without departing from the scope of the present disclosure.

Figure 8:
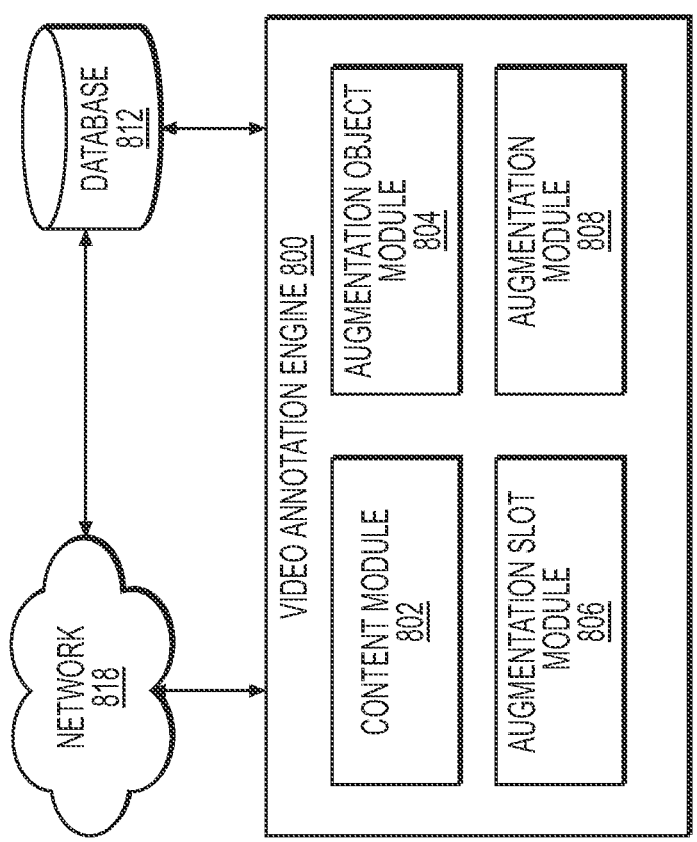
FIG. 8 is a block diagram illustrating components of an exemplary system in accordance with embodiments of the present disclosure.

FIG. 8 is a block diagram illustrating the components for performing the systems and methods discussed herein. FIG. 8 includes a video annotation engine 800, network 810, and database 812. The video annotation engine 800 can be a special purpose machine or processor and could be hosted by an application server, content server, social networking server, web server, search server, content provider, third party server, user's computing device, and the like, or any combination thereof.

According to some embodiments, video annotation engine 800 can be embodied as a stand-alone application that executes on a user device. In some embodiments, the video annotation engine 800 can function as an application installed on the user's device, and in some embodiments, such application can be a web-based application accessed by the user device over a network. In some embodiments, the video annotation engine 800 can be installed as an augmenting script, program or application (e.g., a plug-in or extension) to another media content hosting/serving application (e.g., Yahoo! Sports®, Yahoo! Video®, NFL® Video, NHL® Video, MLB® Video, Hulu®, YouTube®, Verizon® Video, and the like).

Figure 11:
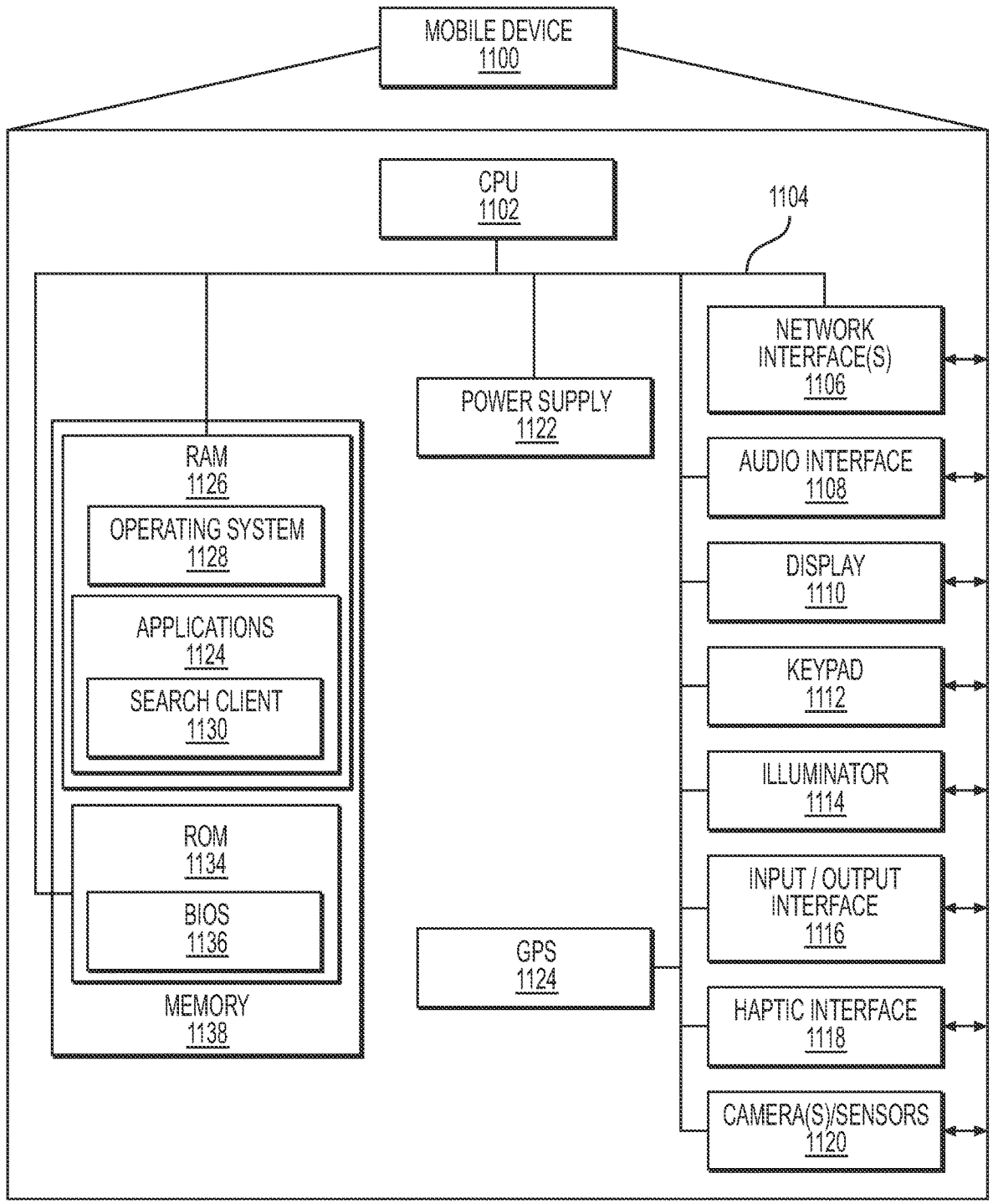
FIG. 11 a schematic diagram illustrating an example of client device in accordance with some embodiments of the present disclosure.

The database 812 can be any type of database or memory, and can be associated with a content server on a network (e.g., content server, a search server or application server) or a user's device (e.g., device 702-706 or device 1100 from FIGS. 7 and 11 respectively). Database 812 comprises a dataset of data and metadata associated with local and/or network information related to users, services, applications, content (e.g., video) and the like. Such information can be stored and indexed in the database 812 independently and/or as a linked or associated dataset. As discussed above, it should be understood that the data (and metadata) in the database 812 can be any type of information and type, whether known or to be known, without departing from the scope of the present disclosure.

According to some embodiments, database 812 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes of creating, augmenting, modifying, streaming, recommending, rendering and/or delivering videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 812 can be any type of information related to a user, content, a device, an application, a service provider, a content provider, whether known or to be known, without departing from the scope of the present disclosure.

According to some embodiments, database 812 can store data and metadata associated with video content from an assortment of media and/or service providers and/or platforms. For example, the information can be related to, but not limited to, content type of the video, a category associated with the video, information associated with the pixels and frames of the videos, information associated with the provider of the video, information associated with the activity being depicted in the video, and any other type of known or to be known attribute or feature associated with a video file, or some combination thereof. Additionally, the video information in database 812 for each video can comprise, but is not limited to, attributes including, but not limited to, popularity of the video, quality of the video, recency of the video (when it was published, shared, edited and the like), and the like. Such factors can be derived from information provided by the user, a service provider (i.e., Verizon®), by the content/service providers providing video content (e.g., Verizon®, ESPN®, ABC Sports®, Netflix®, Hulu®, YouTube®), or by other third party services (e.g., rottentomatoes.com, IMDB™, Facebook®, Twitter® and the like), or some combination thereof.

According to some embodiments, as such video information is received or analyzed, it can be stored in database 812 as an-dimensional vector (or feature vector) representation for each video and/or for frames of the video, where the information associated with the video can be translated as a node on then-dimensional vector. In some embodiments, as digital objects within a video are identified, detected and/or tracked, information corresponding thereto can also be stored in the database 812 in a similar manner. Database 812 can store and index video information in database 812 as linked set of video data and metadata, where the data and metadata relationship can be stored as then-dimensional vector. Such storage can be realized through any known or to be known vector or array storage, including but not limited to, a hash tree, queue, stack, VList, or any other type of known or to be known dynamic memory allocation technique or technology. While the storage discussion above involves vector analysis of video and video information associated therewith, the stored video information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

For purposes of the present disclosure, as discussed above, videos (which are stored and located in database 812) as a whole are discussed within some embodiments; however, it should not be construed to limit the applications of the systems and methods discussed herein. That is, while reference is made throughout the instant disclosure to videos (e.g., streaming, downloadable or on-demand videos), other forms of user generated content and associated information, including for example text, audio, images, multimedia, RSS feed information can be used without departing from the scope of the instant application, which can thereby be communicated and/or accessed and processed by the video annotation engine 800 according to the systems and methods discussed herein.

As discussed above, with reference to FIG. 8, the network 810 can be any type of network such as, but not limited to, a wireless network, a local area network (LAN), wide area network (WAN), the Internet, or a combination thereof. The network 810 facilitates connectivity of the video annotation engine 800, and the database of stored resources 812. Indeed, as illustrated in FIG. 8, the video annotation engine 800 and database 812 can be directly connected by any known or to be known method of connecting and/or enabling communication between such devices and resources.

The principal processor, server, or combination of devices that comprises hardware programmed in accordance with the special purpose functions herein is referred to for convenience as video annotation engine 800, and includes content module 802, augmentation object module 804, augmentation slot module 806, and augmentation module 808. It should be understood that the engine(s) and modules discussed herein are non-exhaustive, as additional or fewer engines and/or modules (or sub-modules) may be applicable to the embodiments of the systems and methods discussed. The operations, configurations, and functionalities of each module, and their role within embodiments of the present disclosure will be discussed below.

Figure 9:
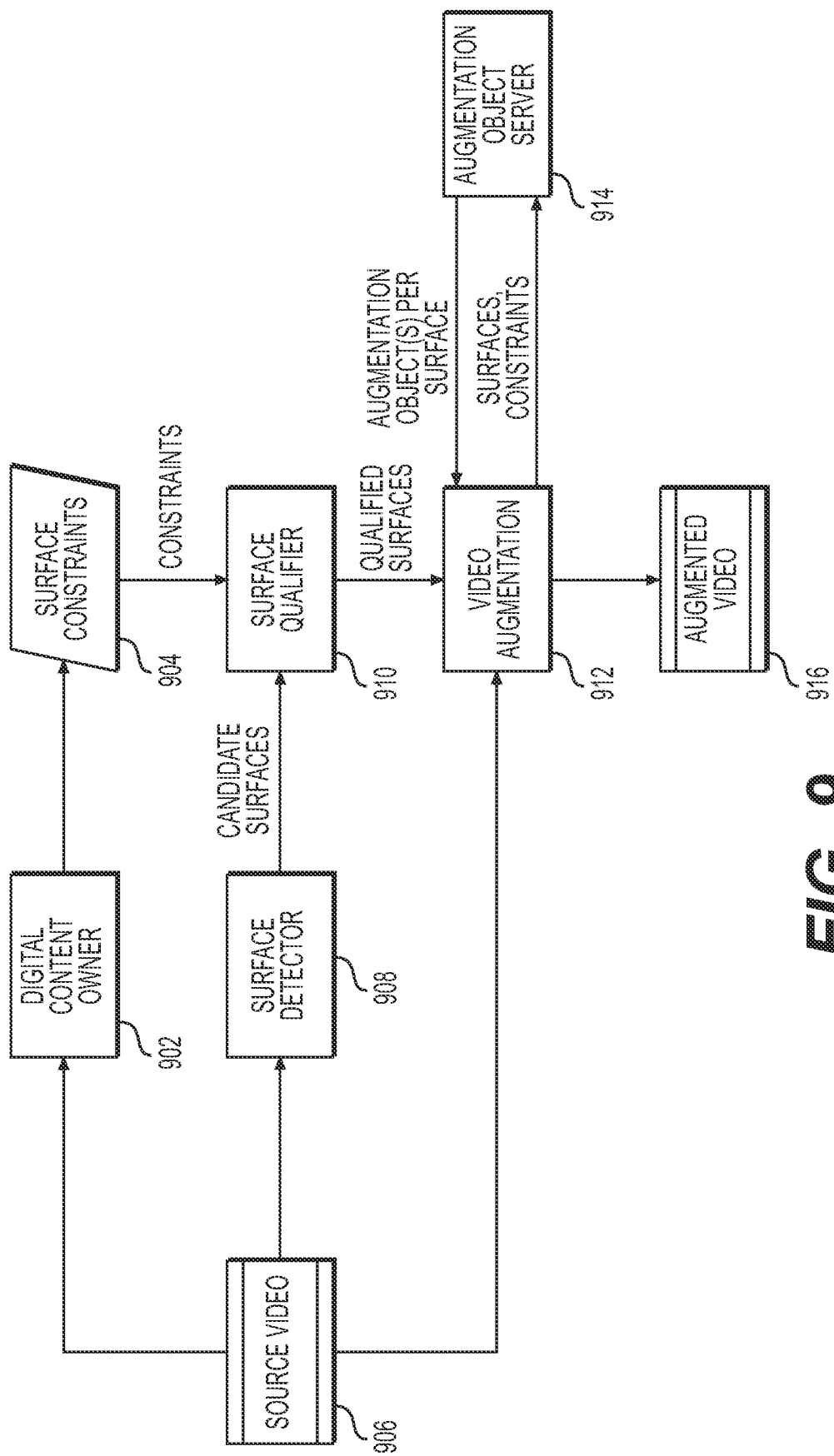
FIG. 9 is a block diagram illustrating a data flow of an exemplary system in accordance with some embodiments of the present disclosure.

Turning to FIG. 9, an overall data flow of the video modification framework is illustrated. The depicted data flow of FIG. 9 (and FIG. 10, as discussed below) provides embodiments where a digital content owner provided source video is identified for modification with an augmentation object (e.g. an advertisement), where such modification occurs at the pixel level on a planer surface depicted by the content of the source video.

As illustrated in FIG. 9, a digital content owner (item 902) creates, uploads, shares, or otherwise provides a source video 906. In some embodiments, the source video 906 can be provided by the digital content owner 902 as a result of a request by another user (e.g., the other user searching for and/or specifically requesting the source video), or by the digital content owner uploading the source video to a platform by which other users can view, edit and/or share with another user set (e.g., uploading the source video to Flickr®, Tumblr®, Facebook®, Twitter®, Instagram®, and the like).

Prior to, or during the process of making the source video 906 available over a network, the digital content owner 902 can provide surface constraints 904. Such surface constraints 904 may be a set of preferences, rules, and/or definitions that govern how the source video 906 can be modified. According to embodiments of the instant application, the surface constraints 904 securely dictate the write-access for a specifically identified set of surfaces depicted within the content of the source video 906. For example, if the video depicts the inside of a car, then the digital content owner can set constraints that limit, permit or deny access to whether and what types of additional digital content (e.g., an ad, as discussed below) can be inserted into the source video for display on the dashboard of the car.

According to some embodiments, the digital content owner provided surface constraints 904 can be provided as a list of constraints in the form of a text file in JSON format. In some embodiments, the defined surface constraints can be provided in XML format. As mentioned above, these constraints define which surfaces are pre-qualified by the digital content owner for augmentation by third party content.

A non-limiting example set of constraints, which can be set as individual constraints or in combination with each other, for all surfaces or specific surfaces within a video, can include, but are not limited to: scene type (e.g., studio, game, crowd, outdoor, and the like), orientation (e.g., horizontal vs. vertical), dimensions, shape, texture (e.g., smooth vs. pattern vs. random), colors, pixel per frame count, alignments (e.g., horizontal vs. vertical), surface size (e.g., minimum vs. maximum), minimum or maximum number of surfaces per frame, location within the frame, position within the video (e.g., time within the video's duration), type of content depicted within the frame(s) (e.g., whether the depicted content is of a person or place, or associated with other proprietary content), and the like.

The source video 906 is then processed by surface detector 908, which performs any type of known or to be known surface detection algorithm, technique, or mechanism. As discussed herein, according to some embodiments, the surface detector 908 parses and analyzes the video and detects a set of surfaces depicted within the content of the source video. In some embodiments, the surface detector 908 identifies all of the surfaces within the source video, and in some embodiments, the surface detector 908 detects a number of surfaces that satisfy a minimum threshold, which can be based on features or attributes of the source video similar to the constraints discussed above. In some embodiments, the detector 908 can detect each frame and compile them into a manifest for the entire video; and in some embodiments, the manifest can be specific to an individual scene(s) within the source video.

Figure 10:
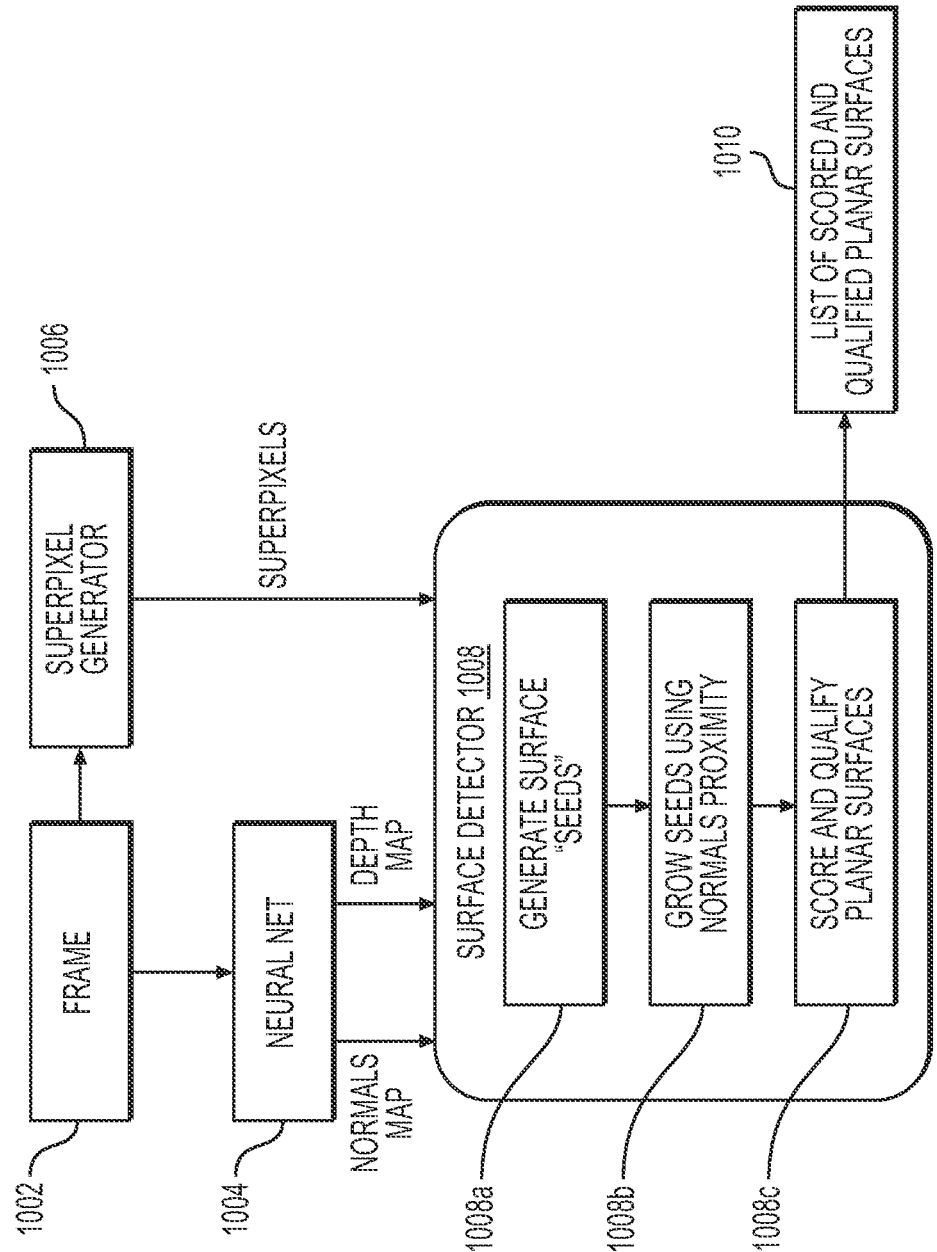
FIG. 10 is a block diagram illustrating a data flow of an exemplary system in accordance with some embodiments of the present disclosure.

An embodiment of the data flow of video processing performed by the surface detector 908 is illustrated in FIG. 10. In FIG. 10, the video 904 is parsed into individual frame sets 1002, which can include individual frames (with dimensions m×n) or a number of frames specific to a scene or scenes (each with dimensions m×n). Each frame set 1002 is then processed by an executed neural network (e.g., convolution neural network (CNN)) algorithm, technique, or mechanism that determines, detects or otherwise identifies each surface depicted therein.

In some embodiments, this involves applying a CNN model to each of the frames of the video (or in some embodiments, the key frames of each scene within the video) which results in parsing and identifying (in some embodiments, extracting) the frame data of the video's frames. Then, upon the identification of the frame data, the detector 908 can execute an object detector and/or optical flow modelling that involves any known or to be known visual recognition model on these inputs, including, for example, the Deformable Parts Model, the Single Shot Detector (SSD), the You Only Look Once (YOLO) detector, and the like. This processing tracks detected surfaces across frame sets (and/or within or across scenes), and produces a manifest of all detected surfaces.

As mentioned above, the manifest can be per video or per scene within a video. The manifest includes information identifying the surface and its attributes according to a normal mapping of the frame data (e.g., an m×n matrix, in which each element is the surface normal for the pixel at a corresponding position), depth mapping of the frame data (m×n matrix, in which each element is a depth (for example, in meters) from the camera to the pixel in the frame) and/or a semantic mapping of the frame data (e.g., and m×n matrix defining dimensions of the elements within each frame). Such mapping can produce information indicating, but not limited to, a timestamp, frame number, surface coordinates, dimensions, depth, surface normal (e.g., a normal (of length 1, for example) vector which is orthogonal to the surface at a certain pixel in a frame), scene in which it appears (e.g., studio, game, outdoors and the like), color, texture and the like (similar to the CO constraints 906).

In some embodiments, the frame set 1002 can be additionally subject to image segmentation (referred to as "superpixel generation") by generator 1006. According to some embodiments, the generator can execute a computer vision algorithm, technique or mechanism that partitions the digital images of each frame 1002 into multiple segments whereby superpixels (e.g., a contiguous group of pixels having similar attributes (within a threshold boundary/range) are identified for example, the location, contours, boundaries (e.g., lines, curves and the like), edges (via edge detection methods), colors (e.g., RGB attributes), intensities, textures of surfaces, and the like, are detected.

Continuing with the data flow of FIG. 10, the surface detector 908 receives the mappings from the neural network 1010 and the superpixels from generator 1006, and generates surface "seeds" 908a. A "seed" is a pixel in the frame 1002 from which the detector 908 can determine/identify a surface. According to some embodiments, as discussed herein, rather than performing a "dense" search for planes within a frame set that considers every pixel, which conventional systems perform that results in inefficient processing times and an overuse of computational resources, the disclosed processing evidences a reduction in processing expenditure and cost by utilizing "seed" pixels from which planes can be derived/determined (referred to as "grown"-grow a surface/plane from data associated with a single pixel/superpixel), as discussed herein.

After identifying the "seeds" of a surface, the detector 908 then utilizes a normals mapping to "grow" them into a detected planar surface, as mentioned above. That is, each "seed" pixel (from the neural network mapping 910) has a corresponding superpixel (from the generator 1006 segmentation). Thus, step 908b "grows" a seed superpixel by as many other superpixels identified by generator 1006 as possible (at least according to a threshold superpixel count), thus identifying a single planar surface. According to embodiments of the disclosure, such "growing" of superpixels is performed by the detector 908 computing the average surface normal for the seed superpixel, then adding its neighboring superpixels recursively if the average surface normal for the neighboring superpixel is oriented in the same direction (indicating that the area in the superpixel is coplanar to the plane that is being grown) within an epsilon of a predetermined value.

In some embodiments, a temporal-smoothing algorithm, technique, or mechanism can be applied in order to ensure that the "grown" surfaces satisfy a threshold level of qualities. For example, surfaces that are detected within the video (e.g., within a number of sequential frames) below a threshold number of times can be discarded. In another non-limiting example, the identification of "isolated islands of non-detections" where a surface was not detected within a frame even though a determined number of surrounding frames have surfaces with similar qualities detected therein—in such example, the frame and/or surrounding frames can be discarded thereby ignoring the surface associated therein.

Upon such "growing" being performed, the planar surfaces are scored and qualified 908c. That is, each of the n planar surfaces identified (in 908b) are scored according to its attributes (identified from 1004 and/or 1006). Thus, a list of scored and qualified planar surfaces is generated item 910, as illustrated in FIGS. 9 and 10. As discussed above, the digital content owner provided a listing/set of constraints. Therefore, the scored planar surfaces are qualified by filtering out the planar surfaces that do not satisfy the constraints set by the digital content owner, such that only those surfaces that satisfy the constraints (at least to a defined threshold level) are produced as the listing 910.

In some embodiments, a maximum number of qualifying surfaces N are set as qualified—if there are more than N, then those with less similarity to the digital content owner constraints are discarded.

Continuing with the data flow of FIG. 9, having now a list (referred to a manifest) of qualified surfaces (i.e., detected surfaces within the source video that satisfy the constraints provided by the digital content), the data flow turns to the modification of the source video. According to some embodiments, the modification can occur at the server side prior to transmittal to a client device for rendering, or can occur at the client side, where the video and augmenting content is sent together within a communication that results in the video being modified prior to its rendering or during its rendering such that the video is modified as the surface identified to be augmented is rendered (e.g., as the keyframes for the scene are being read by a player, for example).

The video augmentation 912 that occurs involves third parties (e.g., endorsers or advertisers, as referred herein, but not so limiting as any other entity or party can have their generated content provided for augmentation) targeting or bidding for opportunities to have their provided content added to the video. In the process of targeting in-video augmentation object placements, advertisers can specify various constraints for potentially qualifying surfaces. Advertisers can specify general targeting criteria, such as, for example, a specific content owner, the context, the scene type, size, orientation and duration of a surface in a video, and the like, or some combination thereof. Additionally, advertisers can also specify what color and texture a surface should have in order to qualify a surface, and whether or not additional augmentation objects may show next to theirs, and the like, or some combination thereof The qualification of whether a surface identified in the manifest (as output from surface qualifier 910) satisfies the advertiser provided constraints is performed in a similar manner as discussed above in relation to determining if identified surfaces satisfy the digital content owner constraints. According to some embodiments, once qualified surfaces specific to the advertiser constraints are detected, their augmentation object placements are sent by the surface detection framework, along with features describing each in-video surface to a augmentation object server 914 for augmentation object (e.g. advertisement) matching. In a similar fashion to surface qualification 910 discussed above in relation to digital content owner qualification, the augmentation object server 914 matches the augmentation objects that target in-video surfaces (e.g., ads comprising content corresponding to the context of the video, the context of the surfaces depicted therein and/or the user, and the like) and that satisfy the constraints of the advertisers. In some embodiments, once a list of matching augmentation objects is created, the augmentation object server may run an auction to select a winning augmentation object that is inserted into the source video 906.

At the conclusion of the data flow of FIG. 9, a qualifying augmentation objects (e.g. advertisements) or augmentation object tags (e.g. ad tags) are returned to the surface detection framework by the augmentation object server 914, whereby, in some embodiments, a verification process can be performed in order to verify that the returned ad qualifies with the CO provided constraints (as described above). If the ad does not qualify, the framework may call the augmentation object server 914 again, otherwise the augmentation object is integrated into the matched surface in the augmented video (item 916) using computer vision techniques, such as, but not limited to, homography and optical-flow, for example.

FIG. 11 is a block diagram illustrating components of an exemplary system in accordance with embodiments of the present disclosure. Client device 1100 may include many more or less components than those shown in FIG. 11. However, the components shown are sufficient to disclose an illustrative embodiment for implementing the present disclosure. Client device 1100 may represent, for example, client devices discussed above in relation to FIG. 7.

As shown in the figure, Client device 1100 includes a processing unit (CPU) 1102 in communication with a mass memory 1138 via a bus 1104. Client device 1100 also includes a power supply 1122, one or more network interfaces 1106, an audio interface 1108, a display 1110, a keypad 112, an illuminator 1114, an input/output interface 1116, a haptic interface 1118, an optional global positioning systems (GPS) receiver 1124 and a camera(s) or other optical, thermal or electromagnetic sensors 1120. Device 1100 can include one camera/sensor 1120, or a plurality of cameras/sensors 1120. The positioning of the camera(s)/sensor(s) 1120 on device 1100 can change per device 1100 model, per device 1100 capabilities, and the like, or some combination thereof Power supply 1122 provides power to Client device 1100.

Client device 1100 may optionally communicate with a base station (not shown), or directly with another computing device. Network interface 1106 is sometimes known as a transceiver, transceiving device, or network interface card (NIC).

Audio interface 1108 is arranged to produce and receive audio signals such as the sound of a human voice. For example, audio interface 1108 may be coupled to a speaker and microphone (not shown) to enable telecommunication with others and/or generate an audio acknowledgement for some action. Display 1110 may be a liquid crystal display (LCD), gas plasma, light emitting diode (LED), or any other type of display used with a computing device. Display 1110 may also include a touch sensitive screen arranged to receive input from an object such as a stylus or a digit from a human hand.

Keypad 1112 may comprise any input device arranged to receive input from a user Illuminator 1114 may provide a status indication and/or provide light.

Client device 1100 also comprises input/output interface 1116 for communicating with external. Input/output interface 1116 can utilize one or more communication technologies, such as USB, infrared, Bluetooth™, or the like. Haptic interface 1118 is arranged to provide tactile feedback to a user of the client device.

Optional GPS transceiver 1124 can determine the physical coordinates of Client device 1100 on the surface of the Earth, which typically outputs a location as latitude and longitude values. GPS transceiver 1124 can also employ other geo-positioning mechanisms, including, but not limited to, triangulation, assisted GPS (AGPS), E-OTD, CI, SAI, ETA, BSS or the like, to further determine the physical location of Client device 11200 on the surface of the Earth. In one embodiment, however, Client device may through other components, provide other information that may be employed to determine a physical location of the device, including for example, a MAC address, Internet Protocol (IP) address, or the like.

Mass memory 1138 includes a RAM 1126, a ROM 1134, and other storage means. Mass memory 1138 illustrates another example of computer storage media for storage of information such as computer readable instructions, data structures, program modules or other data. Mass memory 1138 stores a basic input/output system ("BIOS") 1136 for controlling low-level operation of Client device 200. The mass memory also stores an operating system 1128 for controlling the operation of Client device 1100.

Memory 1138 further includes one or more data stores, which can be utilized by Client device 1100 to store, among other things, applications 1129 and/or other information or data. For example, data stores may be employed to store information that describes various capabilities of Client device 100. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 1100.

Applications 1129 may include computer executable instructions which, when executed by Client device 1100, transmit, receive, and/or otherwise process audio, video, images, and enable telecommunication with a server and/or another user of another client device. Applications 1129 may further include search client 1130 that is configured to send, to receive, and/or to otherwise process a search query and/or search result.

Figure 12:
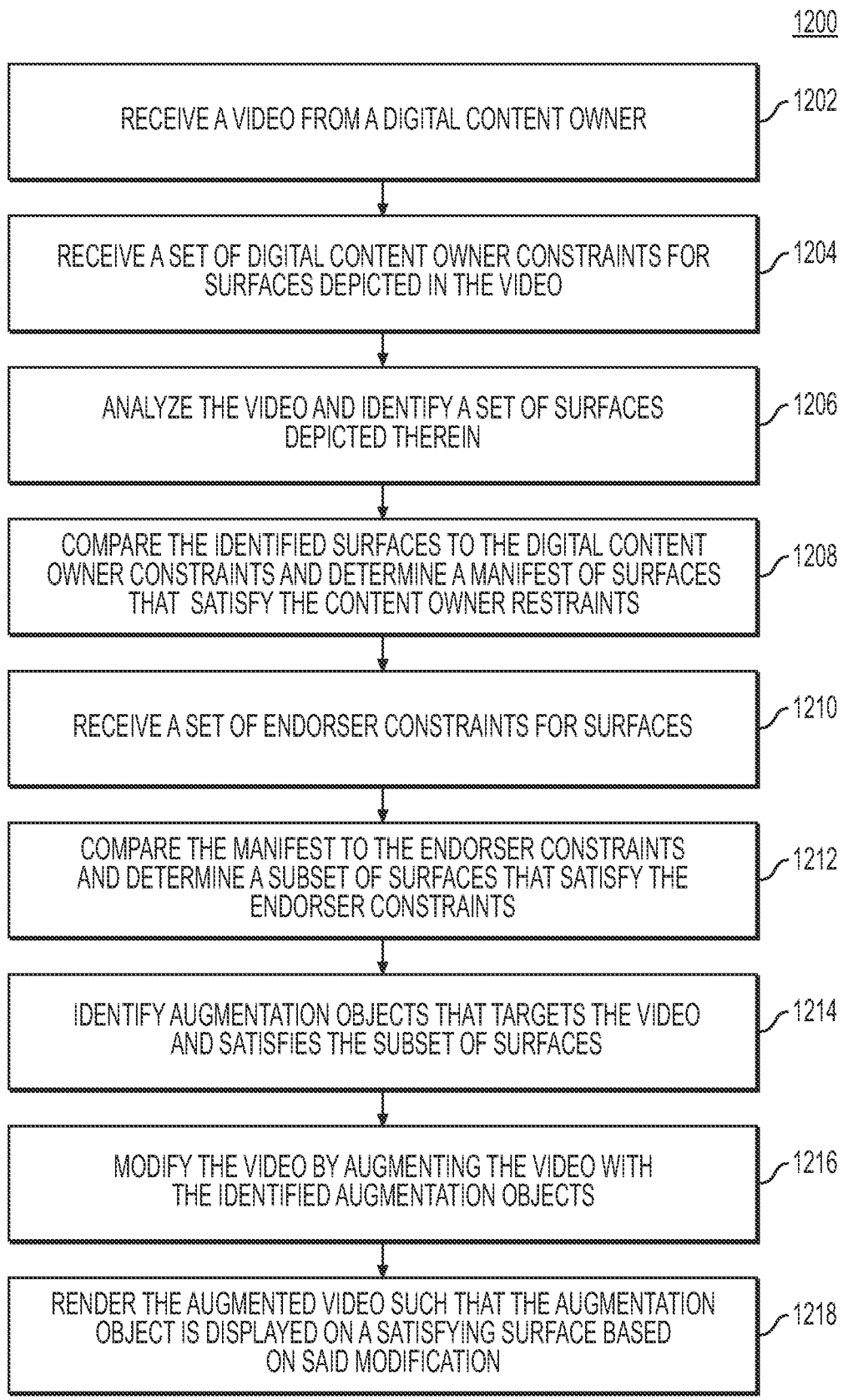
FIG. 12 is flow diagram illustrating steps performed in accordance with some embodiments of the present disclosure.

Turning to FIG. 12, Process 1200 further discusses the steps discussed above in relation to the data flows illustrated and discussed in relation to FIGS. 9-10. Process 1200 details steps performed in accordance with some embodiments of the present disclosure for modifying a digital content owner provided source video file with an endorser (e.g. an advertiser or promoter) provided augmentation object in accordance with constraints/criteria set and/or applied by the digital content owner and endorser.

Steps 1202-1204 of process 1200 are performed by the content module 802 of the video annotation engine 800; Steps 1206-1208 are performed by the augmentation slot module 806; Steps 1210-1214 are performed by the augmentation object module 706; and Steps 1216-1218 are performed by the augmentation module 708.

Process 1200 begins with Step 1202 where a source video file provided by a digital content is received for processing. As discussed above, such processing can be in response to a request from another user or from the digital content owner to render, share or otherwise interact with the video via a media player, on a web page or an application interface. In Step 1204, upon the video being received/identified, digital content owner constraints are received/identified that define which surfaces, and their attributes, the digital content owner is permitting and/or denying access to for inclusion of third party content (e.g. augmentation objects). Such constraints, as discussed above, include information indicating, for example, which types of content can be included in the video, from which providers, and further provide attributes designating specific types of surfaces identifiable within the video.

In Step 1206, the video is analyzed and a candidate listing of surfaces is identified. As discussed above, the candidate listing can include a set of all of the surfaces detected in the video, a portion thereof, or a set of surfaces per scene of the video.

In Step 1208, the candidate listing of surfaces identified in Step 1206 is compared against the digital content owner constraints identified in Step 1204, and a determination is made as to a subset of surfaces that satisfy the digital content owner constraints. As discussed above in relation to FIGS. 9 and 10, the surfaces that are identified as comporting with the digital content owner constraints are compiled into a manifest for the video and/or video scene from which they were identified. The manifest is regarded as a set of qualified surfaces, as discussed above in relation to FIGS. 9-10.

In Step 1210, a set of constraints from an advertiser(s) is received. The advertiser constraints are in relation to the types of surfaces the advertiser desires to or permits having an ad added to within a video, and in a similar manner as the digital content owner constraints discussed above, they can specify particular attributes/features of the source video, the digital content owner, the scene and/or the surfaces depicted therein.

In Step 1212, the manifest (determined from Step 1208) is compared against the advertiser constraints (received in step 1210), and based on this comparison, a subset of surfaces that satisfy the advertiser constraints are identified. As discussed above in relation to FIG. 9, the surfaces that are identified as comporting with the endorser constraints make up the subset identified in Step 1212.

In Step 1214, augmentation objects (e.g. digital advertisements) that target and satisfy the subset of surfaces is/are identified. According to some embodiments, the identification of the augmentation object should be understood to include, but not be limited to, digital media content that provides information provided by another user, service, third party, entity, and the like. Such digital media content can include any type of known or to be known media renderable by a computing device, including, but not limited to, video, text, audio, images, and/or any other type of known or to be known multi-media. Therefore, while the content is referred as an augmentation object (or interchangeably as digital content, an endorsement, or an advertisement), it is still a digital media item that is renderable by a computing device, and such digital media item comprises digital content relaying promotional content provided by a network associated third party.

Step 1214 involves analyzing the video/scene of video and determining a context, which can be based upon information including, but not limited to, the digital content owner, the requesting user, the social, temporal, spatial, and/or topical data surrounding the request and/or communication of the source video, and/or the attributes of the source video, and the like, or some combination thereof. The context serves as the targeting criteria for selecting a particular form of augmentation object. Thus, according to some embodiments, the augmentation object server can perform (e.g., is caused to perform as per instructions received from the device executing the video annotation engine 800) a search for relevant digital content within an associated content database (e.g., content database 812 from FIG. 8) where the search for the content is based at least on the identified context.

Step 1214 further involves ensuring that the identified content adheres to the definitions and constraints of the identified surface (from the manifest from Step 1208) and the advertiser constraints. Thus, the attributes, definitions, and/or content of the identified augmentation object are ensured as complying with the advertiser and digital content owner constraints, such that the content added to the video is permitted by all entities involved. In some embodiments, the augmentation object can be modified to conform to the constraints associated with the surface, frame(s), page, and the like, upon which the content item will be displayed, and/or the attributes or capabilities of to the application and/or device for which it will be displayed.

In Step 1216, the source video is modified based on the identified augmentation objects. As discussed above in relation to FIG. 9, the source video is augmented with the augmentation objects such that the source video is modified to include the augmentation objects. In some embodiments, the modification can include adding a reference (e.g., a pointer) or other data object that references, identifies or otherwise retrieves and inserts the digital ad into the video data/content. Therefore, when the augmented video is rendered, the ad is displayed on the planar surface upon which it was selected for (in Step 1214). Thus, in Step 1218, the augmented video is rendered according to the augmentation occurring in Step 1216.

What is claimed is:

1. A computer-implemented method for dynamically augmenting content, comprising:

receiving digital content and corresponding digital content owner constraints for one or more surfaces depicted therein, from a digital content owner;

analyzing the digital content to identify one or more surfaces depicted therein;

comparing the identified surfaces to the digital content owner constraints and determining a manifest of surfaces that satisfy the digital content owner constraints;

receiving a set of endorser constraints for one or more surfaces;

comparing the manifest of surfaces to the endorser constraints and determining a subset of surfaces that satisfy the endorser constraints;

identifying augmentation objects that target and satisfy the subset of surfaces;

modifying the digital content by augmenting the digital content with the identified augmentation objects;

clearing cache for content rendering by cancelling current cache operations based on a calculated past and future buffer size; and rendering an augmented digital content such that the augmentation object is displayed on at least one surface of the subset of surfaces.

2. The computer-implemented method of claim 1, further comprising:

analyzing the digital content in order to identify known features; and generating a companion video based on the identified known features.

3. The computer-implemented method of claim 1, further comprising:

calculating a current frame of the digital content; and determining if augmentation slots are available for the current frame.

4. The computer-implemented method of claim 1, wherein determining a subset of surfaces that satisfy the endorser constraints further comprises:

scoring the subset of surfaces based on a comparison of the manifest of surfaces and the subset of surfaces satisfying the endorser constraints.

5. The computer-implemented method of claim 1, further comprises generating homography transformation data for a graphical processing unit in order to render the modified digital content.

6. The computer-implemented method of claim 5, wherein generating homography transformation data for a graphical processing unit further comprises:

implementing one or more of: a direct linear transformation algorithm utilizing a homography matrix, or automatic image mosaicking.

7. The computer-implemented method of claim 1, further comprising:

evaluating a current cache state by calculating past and future buffer size; and cancelling current cache fill operations and destroying cache contents that exceed the calculated past and future buffer size.

8. The computer-implemented method of claim 1, wherein the digital content and one or more augmentation objects is one or more of a video, text, audio, and/or images.

9. A system for dynamically augmenting content, comprising:

a processor and storage medium storing instructions, the processor configured to execute the instructions to perform a method including:

receiving digital content and corresponding digital content owner constraints for one or more surfaces depicted therein, from a digital content owner;

analyzing the digital content to identify one or more surfaces depicted therein;

comparing the identified surfaces to the digital content owner constraints and determining a manifest of surfaces that satisfy the digital content owner constraints;

receiving a set of endorser constraints for one or more surfaces;

comparing the manifest of surfaces to the endorser constraints and determining a subset of surfaces that satisfy the endorser constraints;

identifying augmentation objects that target and satisfy the subset of surfaces;

modifying the digital content by augmenting the digital content with the identified augmentation objects;

clearing cache for content rendering by cancelling current cache operations based on a calculated past and future buffer size; and rendering an augmented digital content such that the augmentation object is displayed on at least one surface of the subset of surfaces.

10. The system of claim 9, further comprising:

analyzing the digital content in order to identify known features; and generating a companion video based on the identified known features.

11. The system of claim 9, further comprising:

calculating a current frame of the digital content; and determining if augmentation slots are available for the current frame.

12. The system of claim 9, wherein determining a subset of surfaces that satisfy the endorser constraints further comprises:

scoring the subset of surfaces based on a comparison of the manifest of surfaces and the subset of surfaces satisfying the endorser constraints.

13. The system of claim 9, further comprises generating homography transformation data for a graphical processing unit in order to render the modified digital content.

14. The system of claim 13, wherein generating homography transformation data for a graphical processing unit further comprises:

implementing one or more of: a direct linear transformation algorithm utilizing a homography matrix, or automatic image mosaicking.

15. The system of claim 9, further comprising:

evaluating a current cache state by calculating past and future buffer size; and cancelling current cache fill operations and destroying cache contents that exceed the calculated past and future buffer size.

16. The system of claim 9, wherein the digital content and one or more augmentation objects is one or more of a video, text, audio, and/or images.

17. A non-transitory computer readable medium for dynamically augmenting content, tangibly encoded with computer-executable instructions, that when executed by a processor performs a method comprising:

receiving digital content and corresponding digital content owner constraints for one or more surfaces depicted therein, from a digital content owner;

analyzing the digital content to identify one or more surfaces depicted therein;

comparing the identified surfaces to the digital content owner constraints and determining a manifest of surfaces that satisfy the digital content owner constraints;

receiving a set of endorser constraints for one or more surfaces;

comparing the manifest of surfaces to the endorser constraints and determining a subset of surfaces that satisfy the endorser constraints;

identifying augmentation objects that target and satisfy the subset of surfaces;

modifying the digital content by augmenting the digital content with the identified augmentation objects;

clearing cache for content rendering by cancelling current cache operations based on a calculated past and future buffer size; and rendering an augmented digital content such that the augmentation object is displayed on at least one surface of the subset of surfaces.

18. The non-transitory computer readable medium of claim 17, further comprising:

analyzing the digital content in order to identify known features; and generating a companion video based on the identified known features.

19. The non-transitory computer readable medium of claim 17, further comprising:
   calculating a current frame of the digital content; and
   determining if augmentation slots are available for the current frame.

20. The non-transitory computer readable medium of claim 17, wherein determining a subset of surfaces that satisfy the endorser constraints further comprises:
   scoring the subset of surfaces based on a comparison of the manifest of surfaces and the subset of surfaces satisfying the endorser constraints.

* * * * *